June 27, 1967

H. E. CLARK ET AL 3,327,541

SIGNAL PICKOFF AND TORQUE GENERATOR

Filed Oct. 2, 1964

INVENTORS,
Harold E. Clark &
BY Robert F. Wolf

Hugh L. Fisher

ATTORNEY

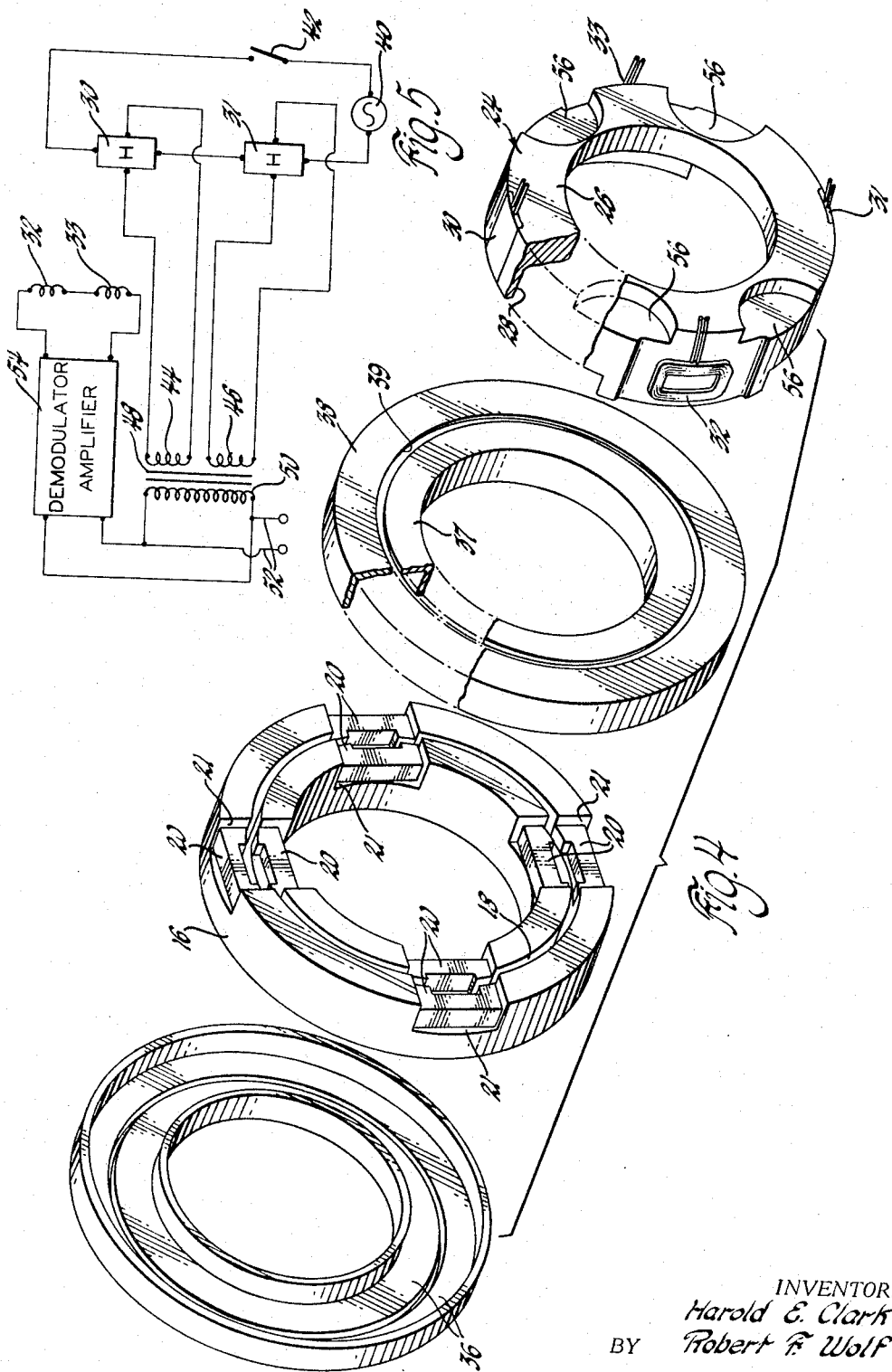

United States Patent Office 3,327,541
Patented June 27, 1967

3,327,541
SIGNAL PICKOFF AND TORQUE GENERATOR
Harold E. Clark, Middleton, Mass., and Robert F. Wolf, Radford, Va., assignors to General Motors Corporation, Detroit, Mich., a corporation of Delaware
Filed Oct. 2, 1964, Ser. No. 401,006
8 Claims. (Cl. 74—5.46)

This invention relates to a combined signal pickoff and torque generator for detecting angular displacement of a rotatable member and restoring the member to a reference position.

A combine displacement pickoff and torque generator, as the name implies, is an apparatus for detecting the angular displacement of a rotatable body, for generating signals indicative of this displacement and for providing a torque tending to restore the rotatable member to a reference position from which the displacements are measured. U.S. Patent No. 3,188,540 discloses a signal pickoff and torque generator having these capabilities. The pickoff and torque generator disclosed in this patent employs at least one pair of Hall effect devices carried on one of two relatively rotatable bodies in combination with permanent magnet means carried on the other of the bodies for generating signals corresponding to the direction and extent of displacement between the two bodies. Normally, this displacement is related to the rotation of a primary member, such as a gyro float assembly, by mounting one of the relatively rotatable bodies on the assembly to serve as a rotor and by fixing the position of the other of the relatively rotatable bodies to act as a stator member. A torquing coil carried by one of the bodies is energized in accordance with the signal from the Hall effect devices to act in connection with the permanent magnet means to provide a torquing force tending to restore the rotatable bodies to a reference position.

The present invention relates to an improved signal pickoff and torque generator in which Hall effect devices are employed in connection with permanent magnet field producing means to detect the displacement between two relatively rotatable bodies, one of which serves a rotor function through a connection with a primary body, and the other of which serves a stator function through connection to a reference frame. The invention further employs at least one torquing coil which operates in connection with the permanent magnet field producing means to provide a torque which tends to restore the two relatively rotatable bodies to a reference position.

Broadly, the invention is accomplished through a combination comprising a first body having an axially extending annular slot formed therein, a plurality of permanent magnet means disposed on the body for producing magnetic fields across the slot at discrete points, and a second body which is coaxially disposed with respect to the first body and has formed thereon an annular sleeve portion which extends axially into the slot of the first body, and which carries at least one Hall effect device and a torquing coil. The first and second bodies are mounted in a rotor-stator relationship so as to permit relative rotation between the bodies about the common axis thereof. This rotor-stator relationship is established by mechanically fixing one of the bodies to a primary member, the displacement of which is to be detected and the other to a frame of reference. According to the invention, at least one Hall effect device is mounted on the sleeve portion of the second body such that it is adjacent one of the magnet means when the first body is in a reference position relative to the second body. In this position, the Hall effect device is responsive to changes in the character of the magnetic field incident thereon, brought about through relative rotation between the first and second bodies, to produce an output signal which represents the displacement. The torquing coil is similarly mounted on the sleeve portion of the second body and similarly disposed adjacent one of the magnet means so as to be within the field produced thereby when the bodies are in the reference position. The combination is provided with control means linking the Hall effect device and the torquing coil in an operative association whereby the signals which are produced by the Hall effect device are productive of a current flow in the torquing coil in a direction and of a magnitude which tends to restore the first and second bodies to the reference position.

While the description given immediately above serves to introduce the present invention, further details and advantages, as well as the operation, of the invention may be best understood by referring to the following specification which describes a specific embodiment of the invention. This specification is to be taken with the accompanying drawings of which:

FIGURE 4 is an exploded view of the specific embodiment indicating a preferred disposition of the Hall effect devices and torquing coils as well as shielding means for the permanent magnet means; and FIGURE 5 is a circuit diagram of control means which may be used with the embodiment of the invention shown in FIGURES 1, 2, 3 and 4.

Figure 1:
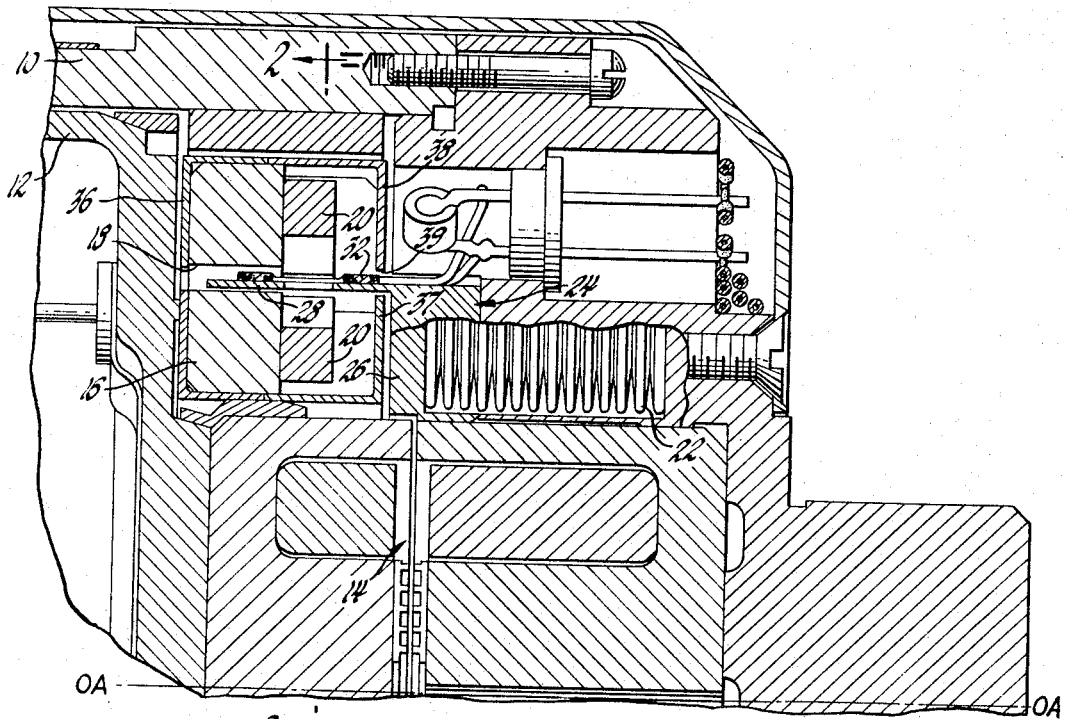
FIGURE 1 is a cross-sectional view of a portion of a single-degree-of-freedom gyro having a float assembly which is rotatable about an output axis and employing the specific embodiment of the inventoin to detect rotation of the assembly.

Referring now to FIGURE 1, there is shown a portion of a gyro including a housing 10 and a float assembly 12 suspended within the housing 10 by magnetic suspension means generally indicated at 14. The gyro shown in FIGURE 1 is of a single-degree-of-freedom variety in which the gyro float assembly 12 is rotatable about a horizontal output axis OA as shown. It is desirable in such a gyro to detect angular displacement of the float assembly 12 about the axis OA. The particular embodiment of the present invention shown in FIGURE 1 and in greater detail in FIGURES 2 through 4 is operatively associated with the gyro means for this purpose.

Figure 2:
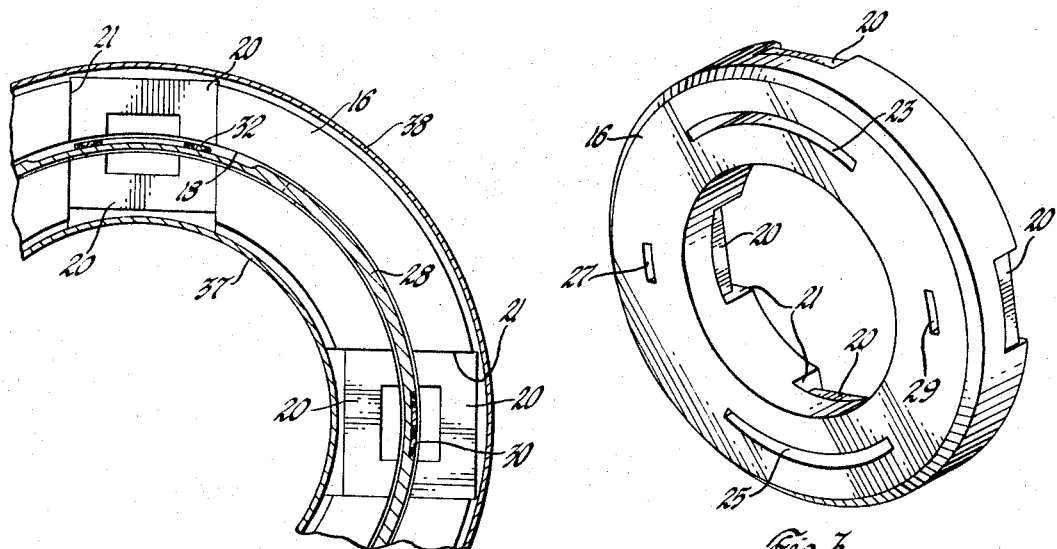
FIGURE 2 is a sectional view of a portion of the embodiment taken along a line 2—2 of FIGURE 1 showing a preferred disposition of the permanent magnet means.
Figure 3:
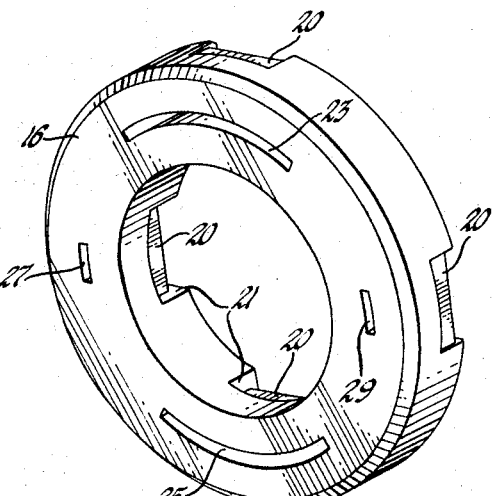
FIGURE 3 is a three-quarter view of the rotor member partly shown in FIGURE 2.

The signal pickoff and torquer shown in FIGURES 1 through 4 includes a rotor member 16 which is secured to the float assembly 12 and rotatable therewith about the axis OA. The rotor member 16 is of a generally annular shape and made of a non-magnetic material such as beryllium. Formed in the rotor member 16 is an axially extending annular slot 18 which is coaxial with the rotor member 16 and float assembly 12. As best shown in FIGURE 3, the slot 18 extends axially through the rotor member 16 from one surface to the other over two diametrically opposite sectors 23 and 25, each of which defines an arc of approximately 70°. Two additional sectors 27 and 29 of about 5° also extend completely through the rotor member 16 for purposes to be explained below. The balance of the slot 18 extends only partially through rotor member 16. Disposed on the rotor member 16 as better shown in FIGURES 2 through 4 are four pairs of U-shaped permanent magnets 20 which pairs are located at 90° intervals about the rotor member 16. The U-shaped permanent magnets 20 are cemented or otherwise secured in appropriately provided recesses 21 in the rotor member 16. As indicated, the magnets 20 of each pair are disposed in mutually facing relation on opposite sides of the slot 18. In addition, the magnets 20 are arranged with opposite poles in juxtaposition such that a complete flux path through each pair of magnets 20 crosses the air gap defined by the slot 18 in two directions thus to provide a bipolar magnetic field across the slot at each of the four locations of the magnets 20 about the annular slot 18. The arcuate sectors 23, 25, 27 and 29 allow for insertion of a four-pronged magnetizing device for magnetizing magnets 20 after assembly. This post-assembly magnetization precludes inadvertent demagnetizing during the assembly.

The pickoff and torquer further includes a generally annular stator member 24 which is also constructed of a non-magnetic material such as beryllium. The stator member 24 is secured to the housing 10 by means of three screws, not shown. The gyro is provided with a plurality of bellows assemblies 22 to maintain the volume of flotation fluid constant with changes in temperature. These bellows, which may be constructed of brass, fit into four semi-cylindrical recesses 56 in the radial portion 26 of the stator member 24 as best shown in FIGURE 4. The stator member 24 is symmetrically disposed about the axis OA. As shown in FIGURE 1, the stator member 24 includes an axially extending sleeve portion 28 which, when the apparatus is assembled as shown in FIGURE 1, projects axially into the slot 18 in the rotor member 16 and is spaced from the walls of the slot 18 to allow for relative rotation between the rotor and stator members. Peripherally disposed on the sleeve portion 28 of the stator member 24 at diametrically opposite positions as shown in FIGURE 4 is a pair of Hall effect devices 30 and 31. The Hall effect devices 30 and 31 are recessed slightly into the surface of the sleeve portion 28 to be flush with the surface.

Hall effect devices, as is well known to those skilled in the art, are solid state devices which exhibit the well-known Hall effect. According to this effect, the devices produce across two opposite faces an output voltage which is proportional to an excitation current applied across two opposite faces at right angles to the output voltage axis and a magnetic field which intercepts the device so as to be mutually orthogonal to the current and voltage axes. Thus, the output voltage can be varied by varying either the excitation current or, as employed here, the magnitude and polarity of the magnetic field which intercepts the device. Thus, by applying a constant excitation current to the device, changes in the applied magnetic field magnitude and polarity will result in corresponding changes in the output voltage magnitude and polarity.

The Hall effect devices 30 and 31 are applied to particular advantage in the present invention for detecting relative displacement between the rotor member 16 and the stator member 24. This is accomplished by defining a reference position for the rotor member 16 relative to the stator member 24 in which position the Hall effect devices 30 and 31 lie squarely between opposite legs of respective pairs of the permanent magnets 20 on opposite sides of the slot 18 as best seen in FIGURES 2 and 4. Displacement of the rotor member 16 relative to the stator member 24 results in a movement of the Hall effect device 30, for example, into one of the two air gaps between the poles of the permanent magnets 20. Counterclockwise rotation of the rotor member 16 as shown in FIGURE 2 tends to move at least a portion of the Hall effect device 30 into the lower air gap whereas clockwise rotation tends to move the Hall effect device 30 into the upper air gap. As noted above, the magnetic flux crosses the gap across slot 18 in opposite directions and, thus, relative to Hall effect device 30. The flux in the two gaps are of opposite polarity. Correspondingly, the output voltage produced by the Hall effect device 30, when moved into the upper air gap is of opposite polarity to the signal which is produced by movement of the Hall effect device 30 into the lower air gap. The same is naturally true of Hall effect device 31.

Also disposed on the stator member 24 are two torquing coils 32 and 33. These coils are cemented or otherwise secured to the periphery of the sleeve portion 28 of the stator member 24 at diametrically opposite position along a diameter rotated 90° from the diameter along which Hall effect devices 30 and 31 are located. The periphery of the stator member 24 is slightly depressed at the location of the coils to allow for proper clearance with the slot 18 in the rotor member 16. So located on the sleeve portion of the stator member 24, the torquing coils 32 and 33 are adjacent respective pairs of permanent magnets 20 when the rotor 16 is in the reference position. As shown in FIGURE 2, the geometry of the coils is such that circumferentially opposite legs of the coils 32 and 33 are directly within the air gaps between the opposite poles of the respective pairs of magnets 20. In this position a DC current of a proper direction through the coils tends to produce, in cooperation with the orthogonal magnetic field, a torque in a direction which is dependent upon the direction of current through the coil. The torquing coils 32 and 33 may be energized by circuit means shown in FIGURE 5 in response to displacement signals from the Hall effect devices 30 and 31 to restore the relative position of the rotor member 16 and stator member 24 to the reference position which is shown in FIGURE 2.

It is apparent from FIGURE 4 that the two diametrically opposite portions of the stator member 24 which carry the torquing coils are of somewhat greater axial length than the remainder of the sleeve portion. These two extensions cooperate with the slot sectors 23 and 25 in the rotor member 16 (FIGURE 3) to limit the total allowable angular displacement of the rotor relative to the stator to a predetermined amount, e.g., ±1°. This construction permits the elimination of lugs mounted on the gyro housing 10 and coacting stops machined onto the float assembly 12 as heretofore used.

Looking to FIGURES 1, 2 and 4, annular shielding means are provided to shield the pickoff device from external magnetic fields. The shielding means includes a first section 36 into which the rotor member 16 fits to be shielded from the interior portion of the gyro. Two additional sections 37 and 38 are provided which enclose the front part of the rotor member 16. The two sections 37 and 38 define an annular slot 39 which corresponds in position with the slot 18 to accommodate the sleeve portion 28 of the stator member 24. The sections 36, 37 and 38 are made of soft iron so as to present a low magnetic reluctance to stray magnetic fields.

Describing the operation of the present embodiment, reference should be had to FIGURE 5. In FIGURE 5, the Hall effect devices 30 and 31 are shown to be connected in series with a source 40 of constant frequency and amplitude alternating voltage. The excitation circuit includes a switch 42 which may be closed to energize the Hall effect devices 30 and 31. With the rotor member 16 and the stator member 24 occupying the reference position shown in FIGURE 2, wherein the Hall effect devices 30 and 31 are intermediate the air gaps between the poles of the permanent magnets 20, equal amounts of fringing flux of opposite polarity traverse the Hall effect devices 30 and 31 and, therefore, no output signals are produced. However, upon rotation of the gyro float assembly 12 shown in FIGURE 1 such that the permanent magnets 20 of the rotor member 16 are rotated relative to the sleeve portion 28 of the stator member 24, the Hall effect devices 30 and 31 are relatively rotated into one of the air gaps between the magnets 20 to produce signal voltages representative of the direction and extent of the relative displacement across a pair of output coils 44 and 46 which are connected to the Hall effect devices 30 and 31, respectively. In the illustrated embodiment, the Hall cells are connected in aiding relation to obtain maximum sensitivity. Accordingly, coils 44 and 46 are inductively linked in flux aiding relation across a transformer core indicated at 48 with a secondary coil 50 which thus receives a displacement signal voltage. This displacement signal voltage appears across terminals 52 and as an indication of the direction and extent of relative rotation between the rotor member 16, and stator member 24. The displacement signal voltage which is induced across secondary coil 50 is connected into a demodulator amplifier 54 which is responsive to the input signal to produce a DC current through torquing coils 32 and 33 which are connected in series as shown in FIGURE 5. The direction of the DC current through coils 32 and 33 is calculated by the demodulator amplifier 54 to produce a torque on the rotor 16 which tends to restore the rotor member 16 and stator member 24 to the reference position. Inasmuch as the rotor member 16 is mechanically fastened to the gyro float assembly 12, it also is restored to a predetermined reference position.

While the present invention has been described with reference to a specific embodiment thereof, various modifications and additions to the specific embodiment will occur to those skilled in the art and, accordingly, the above description is not to be construed in a limiting sense. For a definition of the invention, reference should be had to the appended claims.

What is claimed is:

1. A signal pickoff and torque generator for a rotatable member comprising, a first body having an axially extending annular slot formed therein, a plurality of permanent magnet means disposed on the first body for producing respective magnetic fields across the slot at discrete points, a second body coaxially disposed with respect to the first body and having an annular sleeve portion extending axially into the slot but spaced from the first body, mounting means for permitting relative rotation between the first and second bodies about the common axis thereof in accordance with rotation of the member, at least one Hall effect device mounted on the sleeve portion of the second body for producing output signals related to the character of a magnetic field incident thereon, the Hall effect device being disposed adjacent one of the magnet means when the first body is in a reference position relative to the second body and being responsive to relative rotation between the bodies to produce corresponding output signals, a torquing coil mounted on the sleeve portion of the second body adjacent another of the magnet means so as to be within the field produced thereby when the bodies are in the reference position, and control means connected to receive the output signals and to energize the torquing coil in a manner to tend to return the bodies to the reference position.

2. A signal pickoff and torque generator for a rotatable assembly comprising, a rotor member adapted to be rotated by the assembly about an axis of rotation and having an axially extending annular slot formed therein, a plurality of permanent magnet means disposed on the rotor for producing respective magnetic fields across the slot at discrete points, a stator member coaxially disposed with respect to the rotor member and having an annular sleeve portion extending axially into the slot but spaced from the first body, mounting means for permitting relative rotation between the rotor member and the stator member about the common axis thereof in accordance with rotation of the assembly, at least one Hall effect device mounted on the sleeve portion of the stator member for producing output signals related to the character of a magnetic field incident thereof, the Hall effect device being disposed adjacent one of the magnet means when the rotor member is in a reference position relative to the stator member and responsive to relative rotation between the members to produce corresponding output signals, a torquing coil mounted on the sleeve portion of the stator member adjacent another of the magnet means so as to be within the field produced thereby when the members are in the reference position, and control means connected to receive the output signals and to energize the torquing coil in a manner to tend to return the members to the reference position.

3. A signal pickoff and torque generator for a rotatable assembly comprising, a first support member of non-magnetic material having an axially extending annular slot formed therein, first and second permanent magnet means mounted on the first support member at first and second diametrically opposite locations, third and fourth permanent magnet means mounted on the first support member at third and fourth diametrically opposite locations, each of said magnet means comprising a pair of U-shaped magnets disposed on opposite sides of the slot for producing a bipolar magnetic field traversing the slot, a second support member of non-magnetic material coaxially diposed with respect to the first member and having an annular sleeve portion extending axially into the slot but spaced from the first member, mounting means for permitting relative rotation between the first and second members about the common axis thereof in accordance with rotation of said assembly, a pair of Hall effect devices mounted on the sleeve portion of the second body at diametrically opposite locations, the Hall effect devices being normally disposed intermediate respective pairs of the U-shaped magnets when the second member occupies a reference position with respect to the first member, whereby relative rotation between the bodies produces output signals from the Hall effect devices of a character corresponding to the direction and extent of the relative rotation, at least one torquing coil mounted on the sleeve portion and normally disposed intermediate a pair of U-shaped magnets when the support members are in the reference position so as to be traversed by the bipolar field traversing the slot at that point, and control means connected to receive the output signals and to energize the torquing coil in a manner producing torque tending to restore the support members to the reference position.

4. In combination, a first support member having an axially extending annular slot formed therein, first and second permanent magnet means mounted on the first support member at first and second diametrically opposite locations, third and fourth permanent magnet means mounted on the first support member at third and fourth diametrically opposite locations, each of said magnet means comprising a pair of U-shaped magnets disposed on opposite sides of the slot for producing a bipolar magnetic field traversing the slot, a second support member coaxially disposed with respect to the first member and having an annular sleeve portion extending axially into the slot but spaced from the first member, mounting means for permitting relative rotation between the first and second members about the common axis thereof, a pair of Hall effect devices mounted on the sleeve portion of the second body at diametrically opposite locations, the Hall effect devices being normally disposed intermediate respective pairs of the U-shaped magnets when the second member occupies a reference position with respect to the first member, whereby relative rotation between the bodies products output signals of a character corresponding to the direction and extent of the relative rotation, and at least one torquing coil mounted on the sleeve portion and normally disposed intermediate another pair of U-shaped magnets when the support members are in the reference position so as to be traversed by the bipolar field traversing the slot at that point.

5. A signal pickoff and torque generator for a rotatable body comprising an annular rotor member of non-magnetic material mounted for rotation about an axis in accordance with rotation of said body and having formed therein an axially extending annular slot coaxial with the axis of rotation, first and second permanent magnet means mounted on the rotor member at first and second diametrically opposite locations for producing bipolar magnetic fields across the slot, third and fourth permanent magnet means mounted on the rotor member at third and fourth diametrically opposite locations for producing bipolar magnetic fields across the slot, each of the magnet means comprising a pair of U-shaped magnets disposed in mutually facing relation on opposite sides of the slot to provide flux paths including air gaps defined by said slot, a stator member of non-magnetic material coaxially disposed with respect to the rotor member and having an annular sleeve portion extending axially into the slot but spaced from the rotor member, a pair of Hall effect devices mounted on the sleeve portion at first and second diametrically opposite locations so as to be intermediate the magnets of the first and second magnet means when the rotor member is in a reference position, whereby relative rotation between the rotor and stator members varies the field incident upon the Hall effect devices to produce output signals from the devices corresponding to the direction and extent of the rotation, a pair of torquing coils mounted on the sleeve portion at third and fourth diametrically opposite locations so as to be intermediate the magnets of the third and fourth magnet means when the rotor is in the reference position, and control means connected to receive the output signals and to energize the torquing coils in a manner producing torque tending to restore the support members to the reference position.

6. Apparatus as defined in claim 5, the combination further including shielding means forming a hollow annular enclosing ring of low reluctance material substantially enclosing the rotor member and rotatable therewith, the portion of the shielding means intermediate the rotor and stator members having formed therein an annular slot for accommodating the sleeve portion of the stator members.

7. In combination with a gyro having a float assembly which is rotatable about an output axis, apparatus for sensing the rotation of and for restoring the assembly to a reference position comprising an annular rotor member of non-magnetic material mounted for rotation with the assembly about the axis and having formed therein an axially extending annular slot coaxial with the axis of rotation, first and second permanent magnet means mounted on the rotor member at first and second diametrically opposite locations for producing bipolar magnetic fields across the slot, third and fourth permanent magnet means mounted on the rotor member at third and fourth diametrically opposite locations for producing bipolar magnetic fields across the slot, each of the magnet means comprising a pair of U-shaped magnets disposed in mutually facing relation on opposite sides of the slot to provide flux paths including air gaps defined by said slot, shielding means forming a hollow annular enclosing ring of low magnetic reluctance material substantially surrounding the rotor member and rotatable therewith, the shielding means having formed therein an annular slot corresponding with the slot of the rotor member, a stator member of non-magnetic material coaxially disposed with respect to the rotor member and having an annular sleeve portion extending axially through the slot of the shielding means and into the slot of the rotor member, but spaced from the rotor member and shielding means, a pair of Hall effect devices mounted on the sleeve portion at first and second diametrically opposite locations so as to be intermediate the magnets of the first and second magnet means when the rotor member is in a reference position, whereby relative rotation between the rotor and stator members varies the field incident upon the Hall effect devices thereby to produce output signals from the devices corresponding to the direction and extent of the rotation, a pair of torquing coils mounted on the sleeve portion at third and fourth diametrically opposite locations so as to be intermediate the magnets of the third and fourth magnet means when the rotor is in the reference position, and control means connected to receive the output signals and to energize the torquing coil in a manner producing torque tending to restore the support members to the reference position.

8. Apparatus as defined in claim 7 wherein the axially extending annular slot includes an arcuate portion which extends axially through the rotor member and the sleeve portion of the stator member includes an arcuate extension of greater axial length than the remainder thereof, said arcuate portion being disposed in the arcuate portion thereby to limit the angular displacement of the rotor member relative to the stator member to the difference in circumferential dimension between said portion and said extension.

References Cited
UNITED STATES PATENTS 3,162,804  12/1964  Parsons _____ 324—45 X
3,188,540  6/1965  Lautzenhiser _____ 74—5.6 X FRED C. MATTERN, Jr., *Primary Examiner.*

J. D. PUFFER, *Assistant Examiner.*